United States Patent [19]
Ho et al.

[11] Patent Number: 6,087,983
[45] Date of Patent: Jul. 11, 2000

[54] SYSTEM FOR BROADCASTING GPS DATA TO A PAGER

[75] Inventors: Derek Ho, Vancouver; Barry D. Buternowsky, Burnaby, both of Canada

[73] Assignee: Glenayre Electronics, Inc., Charlotte, N.C.

[21] Appl. No.: 09/357,577

[22] Filed: Jul. 20, 1999

[51] Int. Cl.[7] .............................. G01S 5/02; H04B 7/185
[52] U.S. Cl. ................... 342/357.09; 342/357.06
[58] Field of Search ................... 342/357.06, 357.09, 342/357.1; 455/422; 701/213

[56] References Cited

U.S. PATENT DOCUMENTS

| | | |
|---|---|---|
| 3,976,995 | 8/1976 | Sebestyen . |
| 4,752,951 | 6/1988 | Konneker . |
| 5,032,845 | 7/1991 | Velasco . |
| 5,051,741 | 9/1991 | Wesby . |
| 5,327,486 | 7/1994 | Wolff et al. . |
| 5,479,408 | 12/1995 | Will . |
| 5,485,163 | 1/1996 | Singer et al. . |
| 5,506,886 | 4/1996 | Maine et al. . |
| 5,515,426 | 5/1996 | Yacenda et al. . |
| 5,625,668 | 4/1997 | Loomis et al. . |
| 5,663,734 | 9/1997 | Krasner . |
| 5,682,142 | 10/1997 | Loosmore et al. . |
| 5,742,907 | 4/1998 | Brown ................................. 455/503 |
| 5,765,112 | 6/1998 | Fitzgerald et al. ................. 455/509 |
| 5,872,539 | 2/1999 | Mullen ................................. 342/357 |
| 5,946,626 | 8/1999 | Foladare et al. . |
| 5,952,959 | 9/1999 | Norris ................................. 342/357 |

*Primary Examiner*—Thomas H. Tarcza
*Assistant Examiner*—Dao L. Phan
*Attorney, Agent, or Firm*—Christensen O'Connor Johnson & Kindness PLLC

[57] ABSTRACT

A communications network for GPS systems is configured so that the service area (i.e., the geographical area to which GPS service is provided) is divided into relatively small sections. Each section has a unique code assigned to it. The satellites of the GPS system transmit the GPS "base data" in the standard manner, which is then processed by a conventional reference GPS network to determine the aiding data. The communications network receives the aiding data determines differential data corresponding to each section. The communications network includes communications base stations that are distributed through the service area, which broadcasts the aiding data and the differential data to the sections. Each communication base station also includes the code of the section in which it is located. Thus, a remote unit in a given section will generally receive transmissions with the code corresponding to the section in which the remote unit is located. Using the received code, each remote unit uses the differential data corresponding to the section in which it is located to calculate pseudoranges, which are used to determine the remote unit's location.

8 Claims, 5 Drawing Sheets

| SATTELITE | BASE DATA | MICRO-ZONE 1 | MICRO-ZONE 2 | MICRO-ZONE 3 |
|---|---|---|---|---|
| $S_1$ | $X_1$ | $\Delta X_{11}$ | $\Delta X_{12}$ | $\Delta X_{13}$ |
| $S_2$ | $X_2$ | $\Delta X_{21}$ | $\Delta X_{22}$ | $\Delta X_{23}$ |
| ⋮ | ⋮ | ⋮ | ⋮ | ⋮ |
| $S_N$ | $X_N$ | $\Delta X_{N1}$ | $\Delta X_{N2}$ | $\Delta X_{N3}$ |

SYSTEM FOR BROADCASTING GPS DATA TO A PAGER

FIELD OF THE INVENTION

The present invention relates to global positioning satellite (GPS) systems and, more particularly, to a system that uses a paging system to broadcast GPS aiding data.

BACKGROUND INFORMATION

GPS systems are used to determine or fix the position of a receiver using signals transmitted simultaneously from several satellites. FIG. 1 illustrates part of a conventional GPS system 10 that can be used to fix the position of a receiver 12, using satellites $S_1$–$S_N$. The receiver 12 is able to receive the transmissions of those satellites that are "in view" (i.e., not blocked by the curvature of the earth). The receiver 12 uses the arrival time differences between the received simultaneously transmitted signals, along with satellite Doppler and position data and other ephemeris data embedded in the simultaneously transmitted signals, to calculate the position of the receiver 12. As is well known, GPS systems typically assign unique pseudorandom sequences for each satellite in the system. The psuedorandom sequences are repeated in each GPS satellite transmission at a set rate, and are used in determining pseudoranges (i.e., relative time delays between received satellite transmissions and a local clock in the receiver 12). The pseudoranges are then used in calculating the location of the receiver 12.

As shown in FIG. 2, some of these conventional systems (referred to herein as reference GPS network systems) use a reference GPS base station 20 that takes a snapshot of the GPS data, which is then sent to a remote unit (RU) 22. Although only one reference GPS base station is shown in FIG. 2, a reference GPS network system typically includes a large number of base stations. The reference GPS network performs some initial processing of the GPS signals received from the satellites. In particular, each reference GPS base station receives the satellite GPS signals via a GPS antenna 24. Data from the processed GPS signals (i.e., the aiding data) is transmitted to the RU 22 through a wireless link, via an antenna 25. The RU 22 receives the processed GPS signals via the wireless link using an antenna 25. The RU 22 also receives the GPS signals from the satellites using a GPS antenna 28. The RU 22 can then relatively quickly and accurately calculate its position using the received GPS signals from the satellites and the corresponding processed GPS data from the base station 20. One such conventional system is disclosed in U.S. Pat. No. 5,663,734 issued to Krasner.

However, one problem with this conventional reference GPS network system is that when a location fix is requested by a RU, the network sends out the satellite data individually to the requesting RU. This system of sending satellite data in response to individual requests is a relatively inefficient use of the bandwidth of the wireless link. Consequently, there is a need for a wireless link that efficiently uses its available bandwidth.

SUMMARY

In accordance with aspects of the present invention, a communications network for reference GPS network systems is provided. In one aspect of the invention, the service area (i.e., the geographical area to which GPS service is provided) is divided into relatively small sections. Each section has a unique code assigned to it. The satellites of the GPS system transmit the GPS signals, which are received and processed by a reference GPS network in a conventional manner to generate the standard aiding data. However, in accordance with the present invention, the communication network includes several communications base stations. In one embodiment, the communications base stations are separate from the reference GPS base stations. From the aiding data and the known locations of the sections, the communications network determines differential data corresponding to each section. The communications network then broadcasts the differential data and aiding data to the sections. In particular, the communications base stations in each section broadcast the differential data with the unique code assigned to that section. Remote units requesting a location fix then use the unique codes to extract the differential data corresponding to the section in which the remote unit is located. The accuracy of the pseudorange calculations is increased and the processing load decreased by limiting the size of the sections.

In another aspect of the present invention, the communications network periodically broadcasts the differential data and aiding data as described above. This technique avoids the problem of some conventional systems that must receive and process location fix requests on an individual RU basis before the satellite data is transmitted to the RU. As a result, this aspect of the present invention more efficiently uses the available bandwidth of the communication system to service location fix requests. In addition, the continuous periodic broadcasts reduce latency in that the RU does not have to wait to receive the aiding data before calculating pseudoranges.

BRIEF DESCRIPTION OF THE DRAWINGS

The foregoing aspects and many of the attendant advantages of this invention will become more readily appreciated by reference to the following detailed description, when taken in conjunction with the accompanying drawings described below.

DETAILED DESCRIPTION

Figure 1:
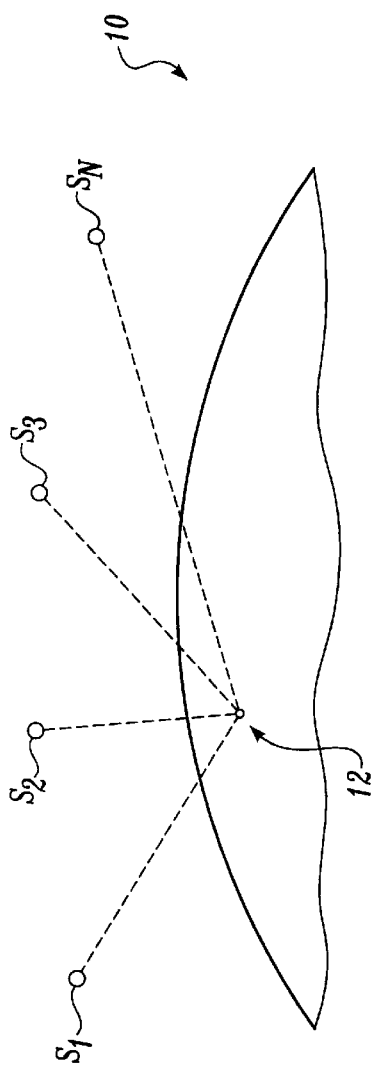
FIG. 1 is a simplified diagram of satellites and a receiver in a conventional GPS system.
Figure 2:
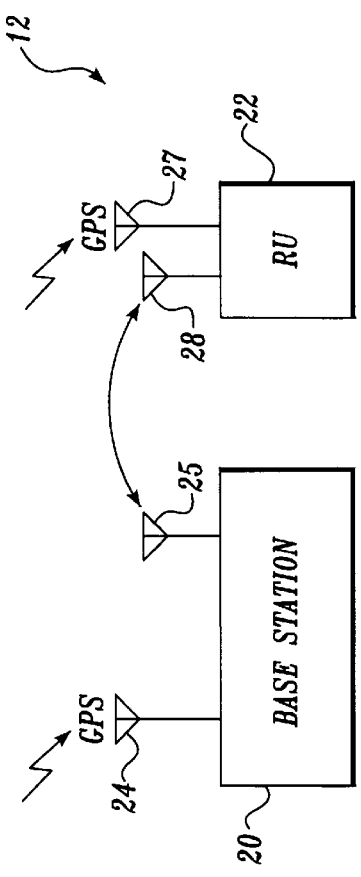
FIG. 2 is a simplified functional block diagram illustrating a base station and remote unit of a conventional GPS system.
Figure 3:
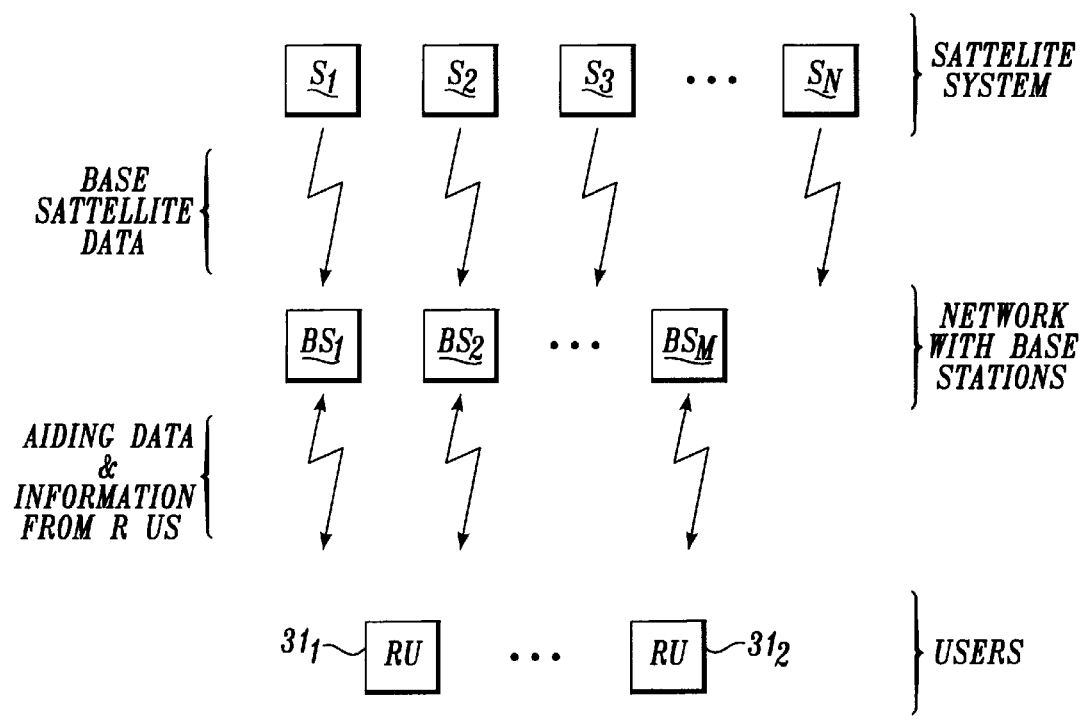
FIG. 3 is a diagram illustrating signal flow in a GPS communication link according to one embodiment of the present invention.

FIG. 3 illustrates signal flow in a GPS communication network according to one embodiment of the present invention. The satellites $S_1$–$S_N$ periodically broadcast the satellite data as in a conventional GPS system, which is received and processed by a reference GPS network (not shown) to determine the aiding data in the conventional manner.

The communications base stations $BS_1$–$BS_M$ then periodically broadcast the aiding data as in a conventional reference GPS network system, except that the aiding data includes differential data corresponding to each of a group of predefined sections in the service area. The communications network is configured to determine the differential data. This is described below in conjunction with FIG. 5 for one particular type of embodiment. One embodiment of the communications network is described below in conjunction with FIG. 7.

Each of the sections in the group has a unique predefined code. In one embodiment, the codes are geographically Gray coded so that the codes of nearby sections only differ by small number of bits. In one embodiment, the sections have a maximum width of about ten miles, although the size of the sections can vary trading off process load for section size. By limiting the size of the sections, the data processing load of the communications network can be optimized. It will be appreciated that as data processing technology progresses, the size of the sections may be increased.

In this embodiment, the communications network receives the aiding data from the conventional reference GPS network (not shown) and determines the differential data corresponding to each section. The communications base stations $BS_1$–$BS_M$ of the communications network then broadcast the aiding data and differential data to all of the sections for reception by the RUs. In addition, the communications network causes the communications base stations located in a given section to broadcast the aiding data and the differential data along with the unique code assigned to that given section. In one embodiment, the communications base stations in each section use simulcast techniques to broadcast that particular section's resulting information. The broadcasted information is then received by RUs $31_1$–$31_L$. Using this data from the communications base stations and the satellite signals, the RUs calculate pseudorange information and send the pseudorange information back to the communications network via the base stations $BS_1$–$BS_M$. This communications link between the RUs and the base stations $BS_1$–$BS_M$ is a two-way wireless link that can be implemented using any suitable technology. For example, the communications link can be implemented using two-way paging system using the ReFLEX® protocol, cellular telephone, or other RF systems. The locations of each RU can be calculated as in the aforementioned U.S. Pat. No. 5,663,734.

Figure 4:
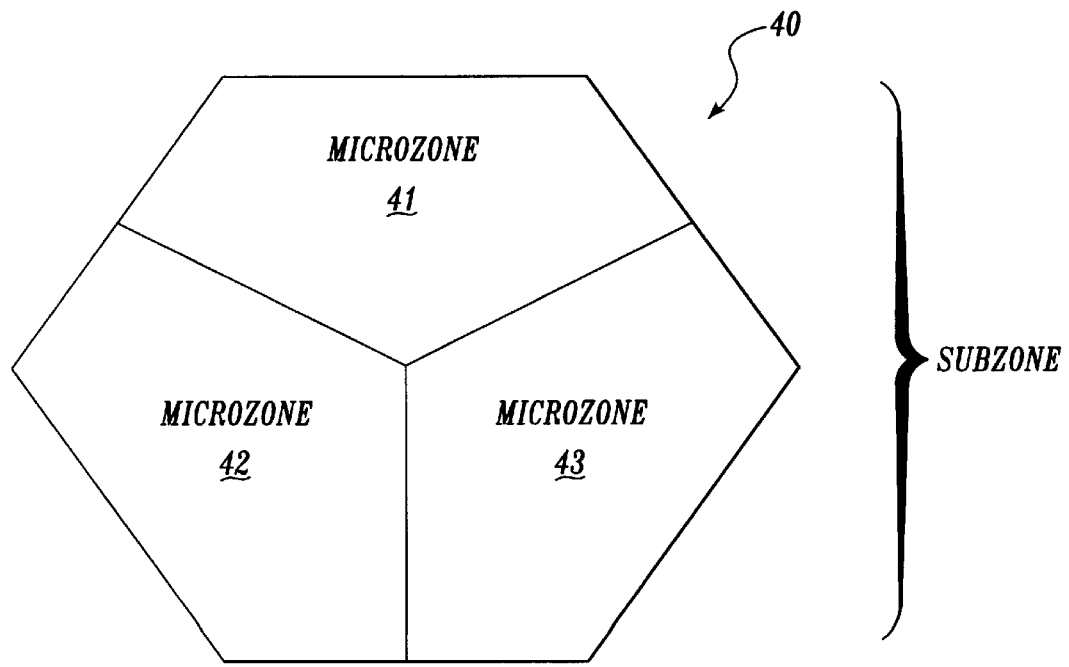
FIG. 4 is a diagram illustrating microzones in a subzone of a GPS communication link, according to one embodiment of the present invention.

FIG. 4 illustrates an embodiment of the communications link in which the sections are implemented as microzones in a subzone of a paging system, according to one embodiment of the present invention. As is well known in the art of paging systems, the service area of some conventional two-way paging systems is divided into zones and subzones. The subzones define simulcast regions in a simulcast paging system. Subzones in a typically conventional paging system have a width or size of up to about 150 miles and may vary in shape. However, in accordance with the present invention, the subzones are divided into microzones. In one embodiment, the subzones have a maximum size of about ten miles. As previously described, this size helps optimize data processing speed in the communications network. The exemplary subzone 40 in FIG. 4 has three microzones 41–43. In light of this disclosure, those skilled in the art will appreciate that the subzones may have different numbers of microzones, and that the microzones may vary in size and shape.

Figures 5, 6:
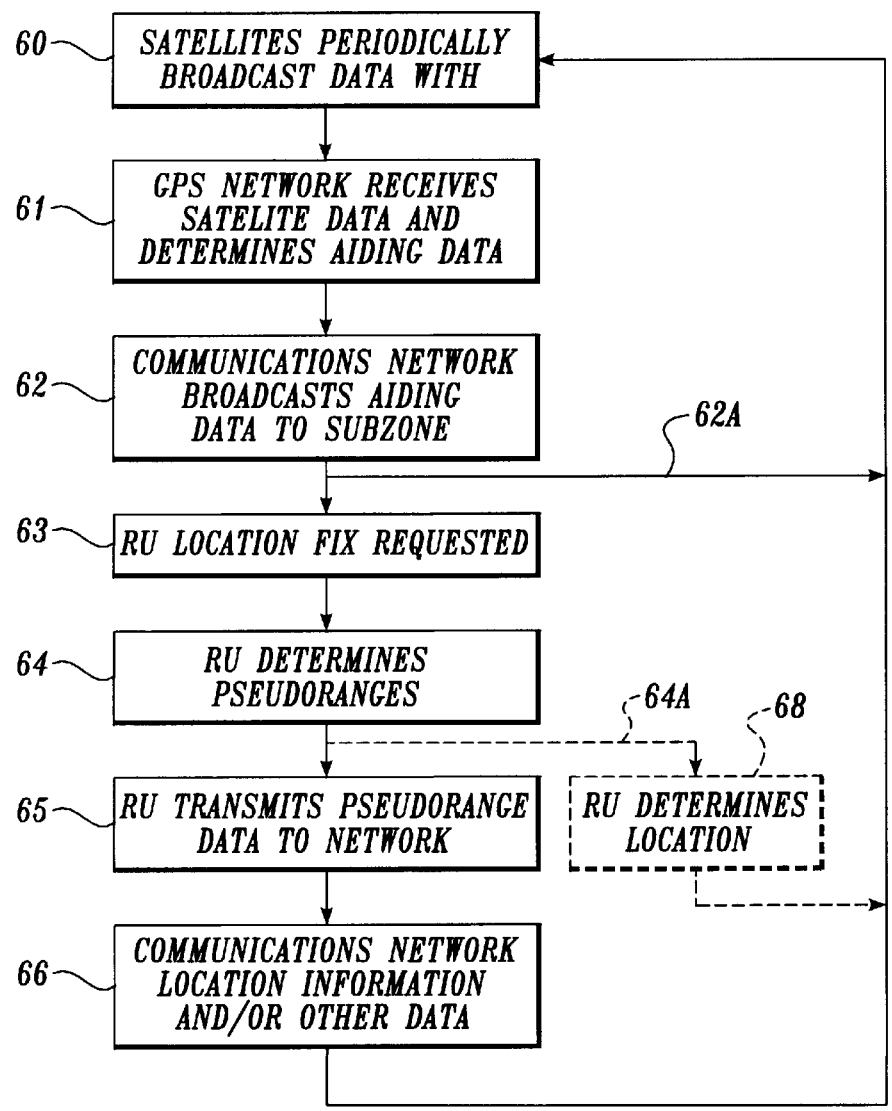
FIG. 5 is a diagram illustrating the coding for the microzones of FIG. 4.
FIG. 6 is flow diagram illustrating the operation of one embodiment of the communications link of the present invention.

FIG. 5 illustrates a table summarizing the coding for the microzones of a subzone. This embodiment is used when a two-way paging system provides the communications link between the communications base stations and the RUs. As shown in the table, for the data received from the satellite $S_1$, the communications base stations in the subzone would broadcast the base data $X_1$, along with the differential data $\Delta X_{11}$ for a first microzone, the differential data $\Delta X_{12}$ for a second microzone and $\Delta X_{13}$ for a third microzone. For example, the base data may include the "base" Doppler shift corresponding to some central point in the subzone. The differential data would then be the relative change of the Doppler data for some center point in the first microzone. Thus, if the base Doppler shift is 200 Hz and the Doppler shift of the first microzone is 205 Hz, then $X_1$ would be 200 Hz while $\Delta X_{11}$ would be +5 Hz.

For the data received from the satellite $S_2$, the communications base stations in the subzone would broadcast the base data $X_2$, along with the differential data $\Delta X_{21}$ for the first microzone, the differential data $\Delta X_{22}$ for the second microzone and $\Delta X_{23}$ for the third microzone. As shown in the table, the base data and differential data for the first, second and third microzones are transmitted for each satellite $S_1$–$S_N$. Further, each communications base station in the subzone broadcasts the differential data for each microzone, along with the unique code assigned to the microzone in which the communications base station is located. This technique advantageously reduces the number of symbols or bits transmitted without loss of information, compared to broadcasting the Doppler shift corresponding to each microzone.

FIG. 6 illustrates how the communications network of the present invention is used in determining a location fix using a GPS system. Referring to FIGS. 3 and 6, the communications network operates as follows. In a block 60, the satellites $S_1$–$S_N$ periodically broadcast GPS satellite data in the conventional manner. In a next block 61, the communications network receives the satellite data using reference GPS network base stations (not shown) in a conventional manner. The reference GPS network (not shown) then processes the received satellite data to generate aiding data in the standard manner. The communications network then receives the aiding data from the reference GPS network and performs further processing. In this embodiment, this processing includes determining the differential Doppler data for each section. In a block 62, the communications network periodically broadcasts the aiding data and differential data to the RUs $31_1$–$31_L$ via the base stations $BS_1$–$BS_M$. This is different from the conventional reference GPS network systems that only transmit the aiding in response to individual location fix requests from a RU. The periodic broadcasting of the aiding data in the present invention avoids the need for receiving and processing location fix requests from RUs before transmitting the aiding data, thereby increasing latency. In addition, including in the periodic broadcasts the differential data and the unique code of the microzone in which each communications base station is located helps ensure that the information is accurate for each particular section while helping to reduce the processing load of the RUs in calculation pseudoranges (described below). This process continuously repeats as indicated by an arrow 62A.

When a location fix is required, the process proceeds to a block 63. In the block 63, a location fix is requested. In one embodiment, the user can request a location fix by pressing a button on the RU, in the conventional manner. Alternatively, the communications network can request a location fix of a particular RU by sending a command over the communications link, via the communications base stations $BS_1$–$BS_M$. In a block 64, the RU determines the pseudoranges using the aiding data and differential data it has received from the base stations $BS_1$–$BS_M$. More particularly, the RU will receive aiding data and differential data from transmissions from nearby base stations. These base stations will also include the unique code of the microzone in which the base stations are located. The RU then combines the differential data corresponding to the microzone of the received code and the aiding data to calculate accurate pseudoranges. For example, the RU can calculate the pseudoranges from the combined aiding data as disclosed in the aforementioned U.S. Pat. No. 5,663,734.

In a block 65, the RU transmits the pseudoranges to the communications network via the communications base stations $BS_1$–$BS_M$. In a block 66, the communications network then calculates the location of the RU and transmits the location to the RU via the communications base stations $BS_1$–$BS_M$. The process then returns to performing the blocks 60–62 until the next RU location fix is requested. In another embodiment, the communications network can transmit other information to the RU instead of or with the location information. For example, the communications network can transmit the location of the nearest gas station, bank, hospital, police station, etc. in response to a request transmitted by the user through the RU. This request would then be forwarded to the communications network via the base stations $BS_1$–$BS_M$.

In an alternative embodiment, the process can proceed from the block 64 to a block 68, as indicated by the dashed arrow 64A. In the block 68, the RU itself calculates its location using the pseudoranges. The process would then return to performing the blocks 60–62 until the next RU location fix is requested.

Figure 7:
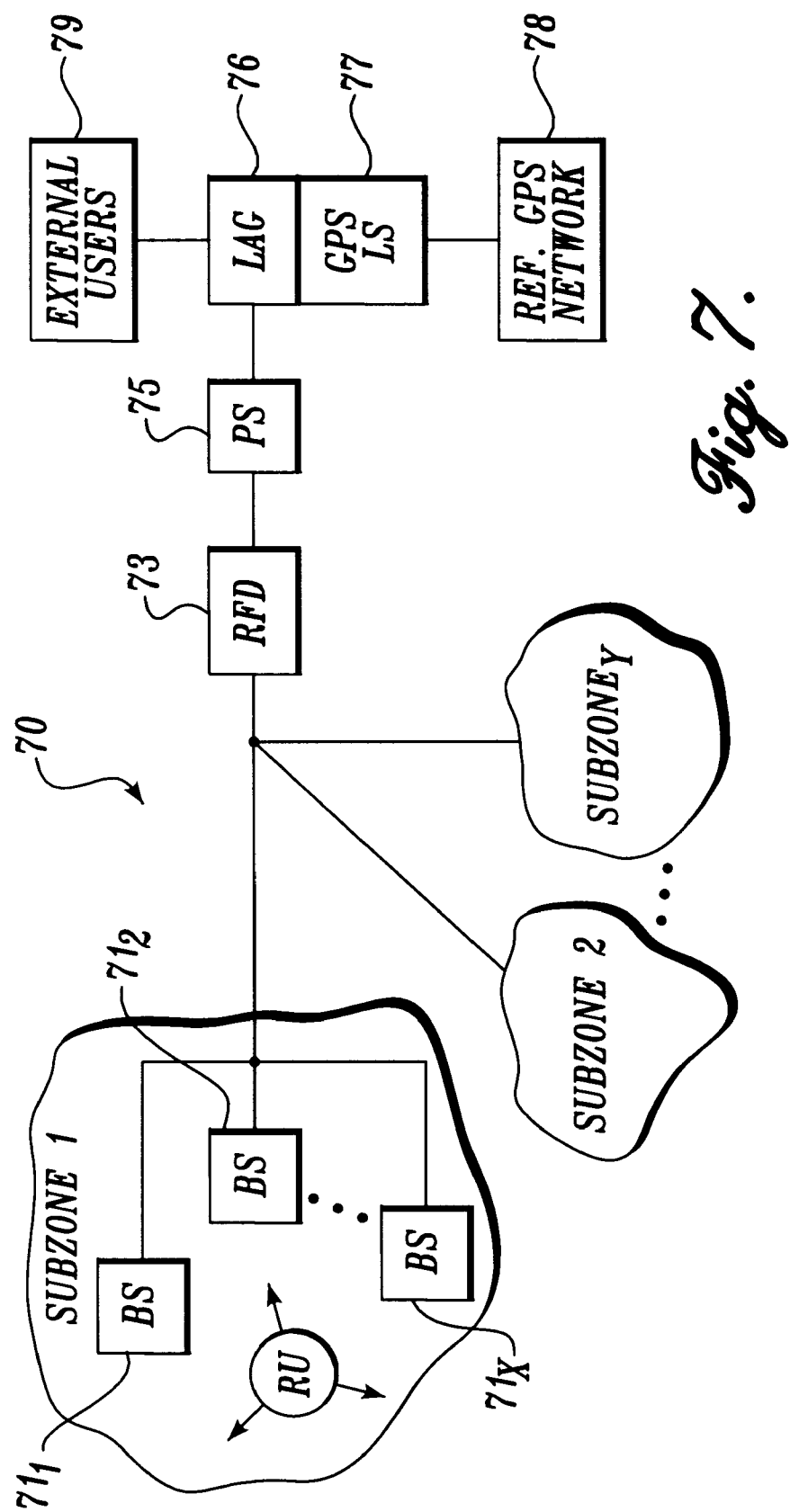
FIG. 7 is a block diagram illustrating a GPS communication system using a modified paging system, according to one embodiment of the present invention.

FIG. 7 illustrates a GPS communication system 70 using a modified paging system, according to one embodiment of the present invention. In this exemplary embodiment, the system 70 divides the service area into several subzones; i.e., subzone 1 through subzone Y. Each subzone includes several paging base stations. In one embodiment, the paging base stations are implemented using components that are commercially available from Glenayre Electronics, Inc., Charlotte, N.C. Of course, other suitable paging base stations or other types of wireless communications devices can be used in other embodiments. In FIG. 7, paging base stations $71_1$–$71_X$ are shown for subzone 1, with the base stations for subzone 2-subzone Y being omitted for clarity. The paging base stations of each subzone are connected to a RF director (RFD). In one embodiment, the RFD 73 is implemented with a model GL3100 RFD (also available from Glenayre). A suitable standard link (e.g., telephone lines, data lines, etc.) is used to support communication between the RFD 73 and the paging base stations. The RFD 73 is configured to handle RU registration, message scheduling and retransmissions.

The RFD 73 is connected to a paging switch (PS) 75, which is configured to provide access to the paging system and to manage the message traffic between the paging base stations and RFD and the rest of the communications network. In one embodiment, the PS 75 is implemented with a model GL3000 messaging switch (also available from Glenayre), although other messaging switches can be used in alternative embodiments. The PS 75 is connected to a location application gateway (LAG) 76. The LAG 76 is configured to determine the location of the RU requesting a location fix, keeping track of the locations of the RUs, and providing an interface to external users. The LAG 76 also provides an interface between the PS 75 (i.e., the paging system) and the processing end of the GPS system. In this embodiment, the processing end of the GPS system includes the GPS location server (GPSLS) 77. The GPSLS 77 extracts the ephemeris and Doppler data from the satellite data received by the base stations of a conventional reference GPS network 78. Alternatively, the GPSLS 77 can determine the location of the RU instead of the LAG 76. The LAG 76 and GPSLS 77 are each implemented using a computer system appropriately programmed. In another embodiment, the functions of the LAG 76 and the GPSLS 77 are combined in a single unit.

In addition, the GPSLS 77 receives differential GPS data and range correction information from the reference GPS network 78, which is extracted from the GPS signals. In one embodiment, the GPSLS 77 and reference GPS network 78 are implemented using technology available from SnapTrack, Inc., San Jose, Calif. An external user interface 79 provides access for external user applications. For example, the user applications can include location dependent traffic information, vehicle tracking, etc.

Figure 8:
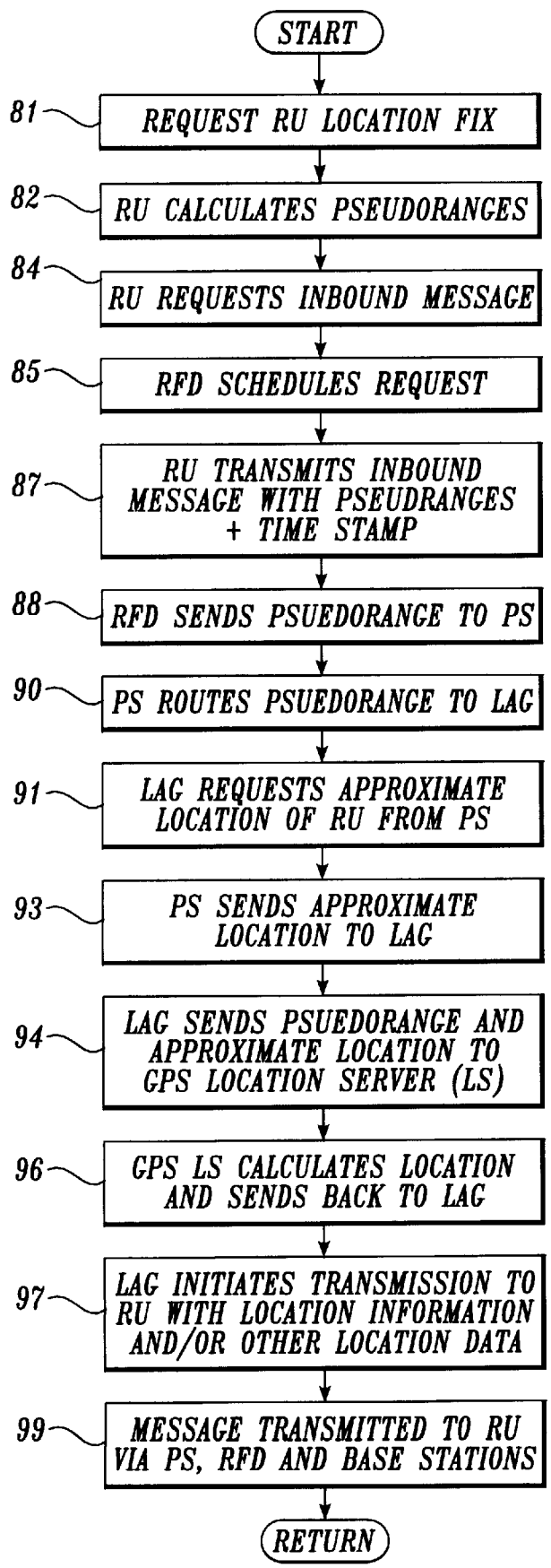
FIG. 8 is a flow diagram illustrating the operation of the system of FIG. 7.

FIG. 8 is a flow diagram illustrating a location fix operation of the communication network 70 (FIG. 7). Referring to FIGS. 7 and 8, a location fix is determined as follows. In a block 81, a RU location fix is requested. As described above, a user can request a location fix by pressing a button on the RU, or the communications network can request the location fix through the paging system. In a block 82, the RU calculates the pseudoranges for the in view satellites using the aiding data and differential data broadcasted by the communications base stations. In a block 84, the RU requests an inbound message transmission through the paging system to provide the pseudoranges to the communications network. This procedure is required in the ReFLEX® protocol. In a block 85, the RFD 73 schedules the request and sends the schedule to the RU through the paging system. In a block 87, the RU transmits the pseudoranges in the requested inbound message. The inbound message also includes other information needed for the location fix calculations, such as a time stamp.

In a next block 88, the RFD 73 routes the inbound message to the PS 75. The PS 75 routes the data to the LAG 76 in a block 90. Then in a block 91, the LAG 76 requests the approximate location of the RU from the PS 75. In this embodiment, the approximate location of the RU is the location of the communications base station that received the inbound message most strongly. Alternatively, the blocks 88–91 may be replaced with a single block in which the RFD 73 automatically also passes the approximate location to the PS 75. In a further refinement, the RFD 73 may pass along all of the signal strengths of the communications base stations.

In a block 93, the PS 75 sends the approximate location to the LAG 76, which, in a block 94, sends the inbound data and the approximate location to the GPSLS 77. Alternatively, the PS 75 may also route the approximate location along with the pseudorange information in the block 90. In a block 96, the GPSLS 77 calculates the location of the RU using the data from the block 94 and data received from the reference GPS network 78 and sends the calculated location back to the LAG 76. In a block 97, the LAG 76 sends the calculated location to the PS 75. The calculated location is then broadcast to the RU over the paging system in a block 99. Alternatively, the LAG 76 may include other information along with the calculated location. For example, the LAG 76 may include the locations of other entities provided by the external user applications via the external users interface 79. In another alternative, the LAG 76 may provide the calculated location to the external user application (e.g., a tracking application) via the external users interface 79.

While the preferred embodiment of the invention has been illustrated and described, it will be appreciated that various changes can be made therein without departing from the spirit and scope of the invention. For example, while a snapshot GPS system is described, in light of this disclosure, those skilled in the art will be able to adapt the invention for use with non-snapshot, real-time, correlation type GPS systems without undue experimentation.

What is claimed is:

1. A method of providing global positioning satellite (GPS) data to a remote unit in a GPS system, the GPS system having a service area, the method comprising:

defining a plurality of sections in the GPS service area;

assigning a unique code to each section of the plurality of sections;

determining a data segment for each section, wherein each data segment for each section is a function of the GPS data and the location of that section relative to a base; and broadcasting the GPS data and the data segments using a plurality of transmitters distributed across the plurality of sections, wherein the plurality of transmitters are configured to simulcast in the plurality of sections the GPS data and all of the data segments.

2. The method of claim 1 wherein, in each section, the transmitters of the plurality of transmitters that are in that section also broadcast information representing the unique code assigned to that section.

3. The method of claim 2, further comprising:

receiving in the remote unit the GPS data and the data segments; and determining a pseudorange using the GPS data and the data segment corresponding to the section in which the remote unit is located.

4. The method of claim 2 wherein the data segments include differential Doppler data relative to Doppler data of the base.

5. The method of claim 2 wherein the transmitters are part of a two-way paging system.

6. The method of claim 2 wherein the transmitters periodically broadcast GPS data and the data segments.

7. A communications network for use with a global positioning satellite (GPS) system to communicate GPS data to a remote unit, the GPS system having a service area in which the remote unit is located and having a reference GPS network, the communications network comprising:

a plurality of transceivers distributed across the service area, the service area being partitioned into a plurality of sections, each section of the plurality of sections being assigned a unique code;

a RF director coupled to the plurality of transceivers;

a message switch coupled to the RF director;

a controller coupled to the message switch and to the reference GPS network, wherein the controller is configured to determine a data segment for each section of the plurality of sections, wherein each data segment for each section is a function of the GPS data and the location of that section relative to a base, and wherein the controller is further configured to cause the plurality of transceivers to broadcast the GPS data and the data segments, wherein the plurality of transmitters are configured to simulcast in the plurality of sections the GPS data and all of the data segments.

8. The communications network of claim 7 wherein, in each section, the transceivers of the plurality of transceivers that are in that section also broadcast information representing the unique code assigned to that section.

\* \* \* \* \*